(12) United States Patent
Calot et al.

(10) Patent No.: US 6,690,935 B1
(45) Date of Patent: Feb. 10, 2004

(54) PACKET MODE TELECOMMUNICATIONS METHOD AND SYSTEM IN WHICH CALLS CAN BE HANDED OVER FROM ONE PATH TO ANOTHER

(75) Inventors: Guillaume Calot, Versailles (FR); Xavier Denis, Puteaux (FR); Jean Farineau, Levallois Perret (FR); Bertrand Duros, Asnieres (FR); Jacques Bousquet, Croissy sur Seine (FR); Philippe Sehier, Saint Germain en Laye (FR); Tarif Zein Al-Abedeen, Castanet (FR); Yves Peligry, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/458,072

(22) Filed: Dec. 10, 1999

(30) Foreign Application Priority Data

Sep. 16, 1999 (FR) .............................. 99 11576

(51) Int. Cl.[7] ................................ H04Q 7/20
(52) U.S. Cl. ...................... 455/436; 455/439
(58) Field of Search ................ 455/436, 432, 455/438, 439, 466, 502, 503; 370/218, 230, 237, 299, 302, 304, 350, 330, 324, 355, 356, 412, 236

(56) References Cited

U.S. PATENT DOCUMENTS

| | | | | |
|---|---|---|---|---|
| 4,701,912 A | * | 10/1987 | Bueno et al. ............... | 370/474 |
| 5,181,200 A | * | 1/1993 | Harrison ..................... | 370/468 |
| 5,530,693 A | * | 6/1996 | Averbuch et al. ........... | 370/331 |
| 5,933,435 A | * | 8/1999 | Shah et al. .................. | 714/749 |
| 5,974,035 A | * | 10/1999 | Norp ........................... | 370/331 |
| 6,021,124 A | * | 2/2000 | Haartsen ..................... | 370/336 |
| 6,105,064 A | * | 8/2000 | Davis et al. ................. | 709/224 |
| 6,128,287 A | * | 10/2000 | Freeburg et al. ............. | 455/442 |
| 6,205,156 B1 | * | 3/2001 | Watanabe et al. ........... | 370/474 |
| 6,496,481 B1 | * | 12/2002 | Wu et al. .................... | 370/242 |

FOREIGN PATENT DOCUMENTS

| | | |
|---|---|---|
| EP | 0 483 551 A2 | 5/1992 |
| WO | WO 98/47302 | 10/1998 |

OTHER PUBLICATIONS

Karagiannis, G. et al.: "Handover Mechanisms in ATMbased Mobile Systems" IEEE Global Telecommunications Conference, US, New York, NY: IEEE. 1998, pp. 2572–2579, XP000801515, ISBN: 0-7803-4985-7.

* cited by examiner

Primary Examiner—Dwayne Bost
Assistant Examiner—Jean A Gelin
(74) Attorney, Agent, or Firm—Sughrue Mion, PLLC

(57) ABSTRACT

The invention concerns a method of transmitting non-dated digital data between a transmitter and a receiver in which the data can take at least two different paths between the transmitter and the receiver and handover from one path to another occurs during transmission. In the transmitter, packets intended for the second path are transmitted only after the last packet intended for the first path has been transmitted and in the transmitter and in the receiver packets on the first or second path are delayed in order for packets on the second path to arrive after packets on the first path. It is therefore not necessary to transmit signaling to differentiate the two paths at the receiver, which can include a single demodulator.

27 Claims, 2 Drawing Sheets

FIG_1
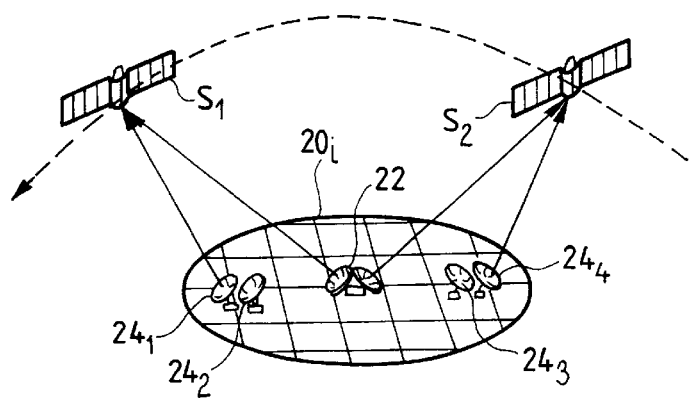
FIG_2
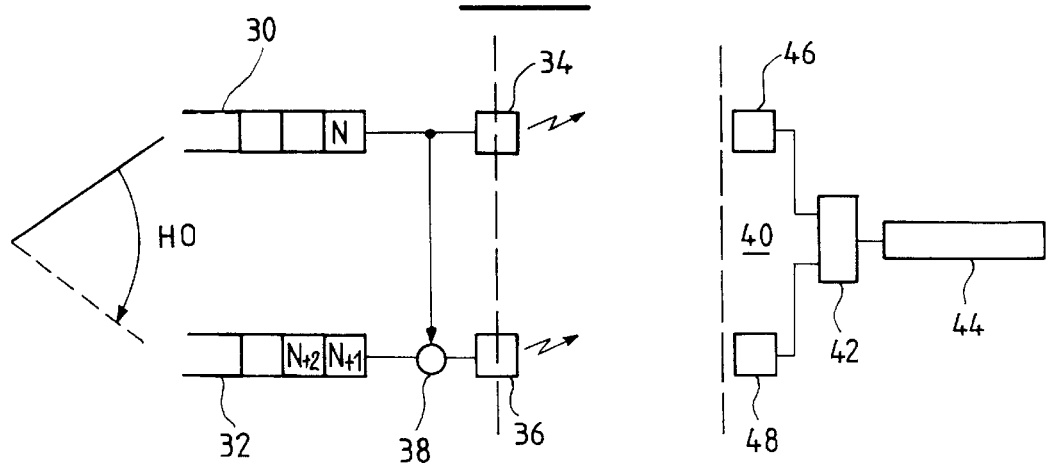
FIG_3
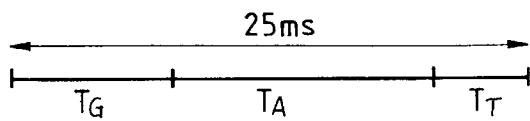

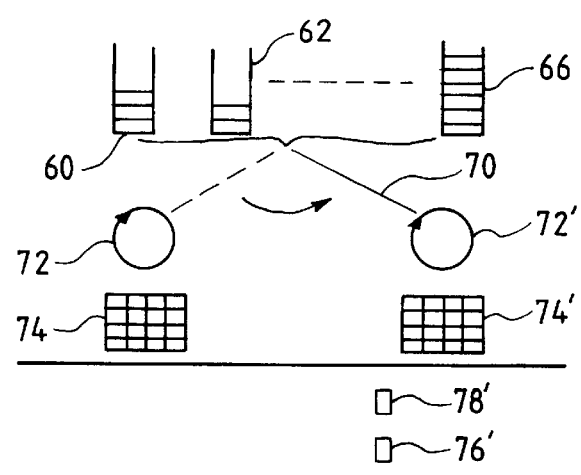
FIG_2a
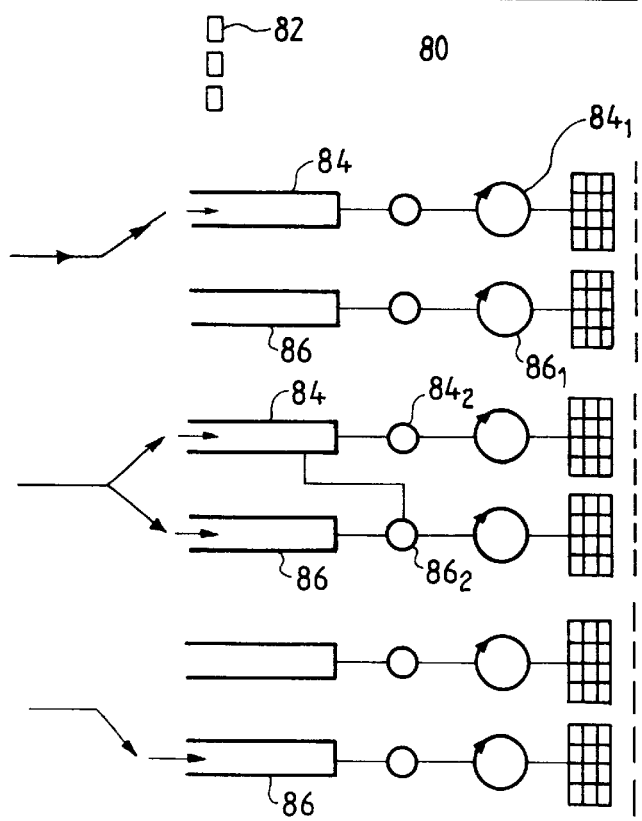
FIG_3a
FIG_3b
FIG_3c
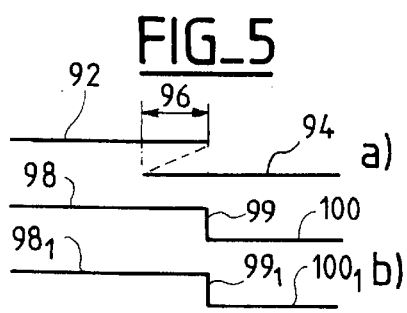
FIG_5
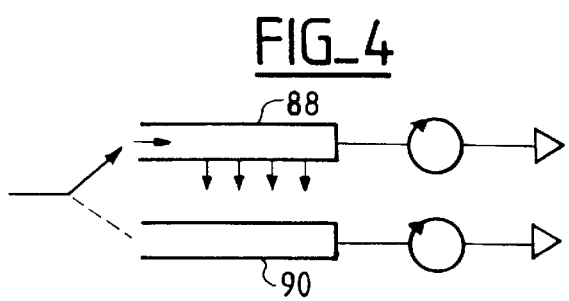
FIG_4

PACKET MODE TELECOMMUNICATIONS METHOD AND SYSTEM IN WHICH CALLS CAN BE HANDED OVER FROM ONE PATH TO ANOTHER

The invention concerns a telecommunications method and system, in particular ones using packet mode, in which it is necessary to transfer calls simultaneously from one path to another.

BACKGROUND OF THE INVENTION

The transfer of calls from one path to another is sometimes referred to as "handover" or "hand-off".

In some communications systems it is necessary for signals to be handed over from one path to another during a call or connection.

A first example of this is a mobile telephone system currently under development, usually referred to as the Universal Mobile Telephone System (UMTS) and in which each mobile station is connected to the network by a fixed base transceiver station radiating in a particular geographical area. The call must be handled by another base transceiver station when the mobile station moves away from that area. The two base transceiver stations are connected on their upstream side to the same switch. Accordingly, in this case, a call between a terminal and a switch must be handed over from a first path via a first base transceiver station to a second path via a second base transceiver station.

A second example is a telecommunications system using a constellation of non-geostationary satellites in low or medium orbit. The orbits are chosen so that practically all of the surface of the Earth is covered, in other words so that at least one satellite can be seen at any time from any point on the Earth (sometimes with the exception of polar areas). Because the satellites are not geostationary satellites, each point on the Earth sees the same satellite for only a limited time, in the order of 15 minutes at most. The telecommunications system is therefore organized so that, from the point of view of a terrestrial user, when one satellite leaves the area of visibility there is another satellite ready to take over the call. In each area, having a diameter of several hundred kilometers, for example, a connection station connects each terminal to the network, and the station and the terminal communicate via a satellite. In this case, the call between a terminal and the connection station is effected initially via a first satellite (first path) and subsequently via a second satellite (second path).

In all such systems, information is transmitted in digital form in cells or packets. The cells comprise a particular number of bits, for example, as in the ATM (Asynchronous Transfer Mode) standard. The packet length can vary.

Because the transmission times are generally different on the two paths, when a call between two particular points, for example a terminal and a connection station, is handed over from one path to another, a cell or packet on the second path can arrive before an earlier cell or packet on the first path, and it is necessary to retransmit the packets or cells in the correct order. Also, handover must not cause any cells or packets to be lost.

In circuit mode, the problem of the order of the cells or packets is solved by dating the transport frame or transmission medium. In other words, each cell or packet corresponds to a given (dated) section of the transmission medium.

This dating solution entails transmitting additional data. Also, it cannot be applied in packet mode because, in this case, the data can belong to different streams of information which are asynchronous and may not correspond to dates of the transmission medium. For example, the same transmission may convey information of different kinds with different bit rates and possibly different priorities.

To solve the problem of the order of the cells or packets at the receiver, the last cell on the first path can be transmitted with a mark, and two receivers can be provided, one for each path, each having a demodulator and a buffer. The buffer of the second path receiver delays the cells received until the last cell of the first path, which is identified by a mark, has been received and processed. Once the last cell has been received, the buffer of the second path receiver is released.

That prior art technique has the drawback of necessitating a receiver with two demodulators and two buffers, one for each path. That disadvantage is particularly serious in the case of a terminal for consumer applications, which must be of low cost. Also, marking the last cell on the first path constitutes signaling that mobilizes limited communications resources.

OBJECTS AND SUMMARY OF THE INVENTION

The invention addresses those drawbacks.

In the transmitter cells or packets intended for the second path are transmitted only after the last cell or packet intended for the first path has been transmitted, and in the transmitter and/or in the receiver cells or packets on the first or second path are delayed so that cells or packets on the second path arrive after cells or packets on the first path.

It is therefore unnecessary to transmit signaling for the last cell on the first path.

Also, the cells or packets on the second path arrive after those on the first path, and it is therefore unnecessary to provide two demodulators. A single demodulator is sufficient.

In an embodiment of the invention, the transmission times on the first and second paths are made equal. To this end, buffers in the transmitter and/or the receiver delay the cells or packets for long enough to obtain equal transmission times, for example.

The buffers are the same as those used to construct queues, for example. They can equally well be separate from those queue memories.

The invention concerns not only a telecommunications method and system but also a transmitter and a receiver for implementing the method.

The transmitter includes two buffers, one for each path, and it includes means for preventing transmission of data at the output of the second buffer and said means are inhibited after transmission of the last cell or packet on the first path.

In one embodiment of the invention, transmitting the last cell or packet on the first path unblocks transmission of cells or packets from the second buffer. Alternatively, the transmission of cells or packets from the second buffer is blocked for a particular time period following the handover command sufficient for the first buffer allocated to the first path to be emptied by transmitting all the cells or packets on the first path.

A receiver in accordance with the invention includes only one demodulator.

The method, the transmitter, and the receiver of the invention can be applied equally well to handing over a single connection or a plurality of connections. However, in the latter case (handing over a plurality of connections), the invention has additional particular features that address the drawbacks of prior art solutions.

Prior art solutions to the problem of packet mode handover from one path to another also have the disadvantage that they take some considerable time to complete handover if there is a multiplicity of connections. This is because:

The cells or packets to be transmitted are held in buffers and there is a buffer for each particular type of waiting data. For example, one buffer (queue) is provided for cells or packets corresponding to telephone conversations, another for electronic mail, and another for image data.

The various queues generally have different rates or speeds. Because the command to hand over or transfer cells or packets is executed on the upstream side of the buffers, the time to transmit the cells or packets to the output of the buffers varies from one buffer to another, i.e. from one connection to another. The time at which each cell or packet is transmitted cannot be predicted, because it depends on the content of each of the buffers and the grade of service each of them is allocated.

Given the above conditions, the time period during which the data is handed over from one path to another cannot be minimized, and this lack of synchronization complicates the transmission of the data.

The invention therefore also provides a method of transmitting non-dated or non-numbered digital data in packet mode between a remote transmitter and a remote receiver in which the data can take at least two different paths between the transmitter and the receiver and handover from a first path to a second path occurs during transmission, a set of buffers temporarily stores the data to be transmitted, and each buffer corresponds to a particular type of data to be transmitted. In the method, handover from the first path to the second path is practically synchronous for the various buffers of the system, and the data on the first and/or the second path is delayed in the transmitter and/or in the receiver so that the data intended for the second path reaches the receiver after the data transmitted on the first path.

The fact that handover is synchronous for the various buffers reduces the overall transfer time to zero.

Moreover, as already indicated, because reception via the first and second paths is separated in time, the receiver can include a single demodulator.

As in the case of a single connection, it is not necessary to transmit signaling for the last cell on the first path.

In one embodiment of the invention there is a single set of buffers and handover from one path to another occurs after the output of the buffers but before the multiplexing of the cells or packets leaving the various buffers. In other words, there are two multiplexing systems, one for each path. In this case, all the outputs of the buffers, i.e. all the connections, are handed over at the same time.

Because handover of data from one path to another is commanded from the output of the buffers, the time of handover is clearly defined and can be independent of the transit times of the cells or packets in the buffers.

The handover mechanism is simple to implement because the multiplexing systems are independent of each other and there are therefore no constraints on allocating powers and communications resources.

In a different embodiment of the invention, there is a set of buffers for each path, and during a duplication period before handover the two buffers receive the same cells or packets, handover from one path to another occurring either when the contents of the two buffers are identical or a predetermined time after the start of duplication.

The solution whereby handover is commanded a particular time after the start of duplication has the advantage that the handover time is clearly defined and so handover is easy to synchronize for all the buffers corresponding to various grades of service.

This embodiment can be used in particular when the handover time is known in advance, as is the case in a telecommunications system using satellites in low or medium orbit.

Note that, if handover from one path to another occurs when the contents of the two buffers are identical, in order to synchronize all the buffers, it is necessary to wait for the contents of all the pairs of buffers to be identical.

In a different embodiment of the invention, in which there is also a set of buffers for each path, cells or packets are transferred from each buffer of the first set (corresponding to the first path) to the corresponding buffer of the second set just before handover from the first path to the second path. However, because it necessitates the transmission of a large quantity of data in a short time period, this embodiment of the invention is more complex than the others. In contrast, the other embodiments do not necessitate any transfer of data from one buffer to another. In some cases, it may be beneficial to transfer signaling, in particular to detect when the contents of the buffers are identical, but such detection does not necessitate any transfer of data as such, only transfer of signaling, for example cell or packet numbers.

The invention therefore provides a method of transmitting non-dated or non-numbered digital data in packet mode between a remote transmitter and a remote receiver in which the data can take at least two different paths between the transmitter and the receiver and handover from a first path to a second path occurs during transmission. In the transmitter cells or packets intended for the second path are transmitted only after the last cell or packet intended for the first path has been transmitted and in the transmitter and/or in the receiver cells or packets on the first or second path are delayed so that cells or packets on the second path reach the receiver after cells or packets on the first path.

In an embodiment of the invention, a first buffer temporarily stores data to be transmitted on the first path, a second buffer temporarily stores data to be transmitted on the second path and transmission of data from the second buffer is blocked until the last cell or packet has been transmitted on the first path.

For this purpose, the last cell or packet on the first path can be marked in the transmitter, in which case the mark is used to unblock transmission on the second path and is eliminated for transmission to the receiver. Alternatively, transmission on the second path is blocked for a predetermined time period from the start of the command to hand over from the first path to the second path.

In one embodiment of the invention, to enable reception of cells or packets on the second path after reception of cells or packets on the first path, the cells or packets on the first or second path are delayed long enough for the transmission times on the two paths to be equal.

The transmission times can be made equal using transmit and/or receive equalization buffers.

In one embodiment of the invention, a set of buffers temporarily stores data to be transmitted, each buffer corresponds to a particular type of data to be transmitted, for example a particular grade of service and/or a particular flow, and handover from the first path to the second path occurs in a practically synchronous manner for the various buffers of the set.

For this purpose, the cells or packets can be delayed long enough for the transmission times on the first and second paths to be the same.

The buffers for temporarily storing data to be transmitted and/or received can be used to delay the cells.

In one embodiment of the invention, handover occurs at the output of the buffers before multiplexing the cells or packets for transmission. The two paths can be multiplexed independently of each other for this purpose.

In another embodiment of the invention, there are two sets of buffers, one for each path. To use this facility before handover from the first path to the second path, the two sets of buffers can be filled with the same cells or packets, handover occurring after the contents of the buffers are identical. In this case, handover can be effected a predetermined time from the start of filling the buffers with the same cells or packets.

Handover can also occur when it is established that the contents of the buffers are identical. This is established when the first duplicated cell or packet of the last of the connections has been transmitted on the first path, for example.

When the two sets of buffers are filled with the same cells or packets before handover, the cells or packets already transmitted on the first path are preferably eliminated from the second set of buffers between transmission of the last cell or packet on the first path and the start of transmission on the second path.

The invention also concerns a receiver adapted to receive digital data transmitted by the above method and includes only one demodulator.

The invention also provides a transmitter for implementing the above method which includes two buffers, the first of which is for temporarily storing non-dated or non-numbered cells or packets intended to be transmitted on a first path and the second of which is for temporarily storing non-dated or non-numbered cells or packets intended to be transmitted on a second path, and means for preventing transmission of data at the output of the second buffer which are inhibited after transmission of the last cell or packet on the first path.

In an embodiment of the invention, the transmitter includes means for marking the last cell on the first path with a mark which is used to command inhibiting of the means preventing transmission of data on the second path. In this case, it is preferable if the mark is eliminated before transmitting the last cell or packet on the first path.

In another embodiment of the invention, the means for preventing transmission of data at the output of the second buffer comprise time-delay means such that the means preventing transmission of data from the second buffer remain active for a particular time period after the command to hand over from the first path to the second path.

In an embodiment of the invention, at least one equalization buffer delays cells or packets on the first or second path long enough for the transmission times on the two paths to be equal. To this end, the temporary storage buffers can also be used for equalization.

The invention also provides an application of the method to a telecommunications system using a constellation of satellites in low or medium orbit in which all the terminals communicate with a connection station via a satellite and another satellite takes over the call, in particular when the first satellite begins to leave the area of visibility of the terminal(s) concerned.

The invention also provides an application of the method to a cellular telecommunications system in which each cellular area includes a base transceiver station for connecting the terminals to the network via a switch, the terminals communicate via a base transceiver station and a call is handed over from a first path via a first base transceiver station to a second path via a second base transceiver station.

BRIEF DESCRIPTION OF THE DRAWINGS

Other features and advantages of the invention become apparent from the following description of embodiments of the invention given with reference to the accompanying drawings, in which:

FIG. 1 is a diagram showing a telecommunications system to which the invention applies, FIG. 2 is a diagram showing the method of the invention of handing over a call from one path to another, FIG. 2a is a diagram showing one embodiment of the invention, FIG. 3 is a diagram showing one mode of operation of the system shown in FIGS. 2 and 2a, FIGS. 3a, 3b and 3c are diagrams relating to a different embodiment of the invention, FIG. 4 is a diagram relating to a further embodiment of the invention, and FIG. 5 is a diagram used to explain other aspects of the invention.

MORE DETAILED DESCRIPTION

The embodiment of the invention described with reference to the figures relates to a telecommunications system including a plurality or constellation of satellites in orbit at an altitude of approximately 1 450 km above the surface of the Earth, which is divided into substantially circular areas 700 km in diameter. Each area $20_i$ (FIG. 1) contains a control station 22, centrally located in the area, for example, and a plurality of terminals $24_1$, $24_2$, $24_3$, $24_4$, etc. The control station 22 is connected to a terrestrial or other type of communications network (not shown).

All calls transmitted or received by a terminal $24_i$ pass through the control station 22 and calls between each terminal and the station 22 pass through a satellite $S_1$ or $S_2$ In other words, in the example shown in FIG. 1, a call between a terminal $24_i$ and a user of the network to which the station 22 is connected, passes through a satellite $S_1$ or $S_2$ and the control station 22. A call between a terminal $24_1$ and another terminal $24_3$ or $24_4$ remote from the terminal $24_1$ passes through the satellite $S_1$, the station 22 and the satellite $S_2$ or $S_1$.

Equipment (not shown) on each satellite for receiving and re-transmitting calls is switched into service in a pre-programmed fashion. In one example, each satellite has control means for "illuminating" a plurality of terrestrial areas at the same time and such that, as it moves, the satellite modifies the beam so that it always impinges on the area in question during its active passage over the area. The maximum duration of its passage is approximately 15 minutes.

Because the period for which a satellite is visible from an area is limited, the constellation of satellites must be arranged so that when a satellite is near the end of its period of visibility another satellite can take over the call. Because the telecommunications system is generally intended for high quality calls, the quality of calls must not be affected by the calls being handed over from one satellite to another. In other words, the system must be organized so that, at least when a satellite handling a call is close to leaving its area of visibility, another satellite is simultaneously in its area of visibility and remains there when the first satellite is no longer visible.

To enable calls to be handed over from a first path to a second path, two sets of transmit buffers 30 and 32 are provided in each terminal and/or in the connection station in the FIG. 2 example.

The buffers 30 are for the first path, i.e. the one that is to be abandoned, and the buffers 32 are for the new path. For example, the first path uses equipment on satellite $S_1$ to connect terminal $24_1$ to station 22 and the second path uses satellite $S_2$ to connect terminal $24_4$ to station 22.

For simplicity, only one buffer is shown in each set 30, 32. However, each set includes a plurality of buffers, for example one per grade of service or per flow.

In the context of the present description, a flow is a volume of traffic data characterized by its destination and/or its grade of service. In ATM terms, a flow is a connection, a virtual path or a virtual channel.

Various methods are available for determining the time of handover from the first path to the second path. In a first method, the handover time is determined by measuring the quality of transmission, for example by measuring the signal-to-noise ratio, and the second path replaces the first path if its transmission quality is better than the quality on the first path. Alternatively, the deterministic nature of the position of the satellites can be used to pre-program the handover times, which can be simultaneous for several terminals.

Prior to the handover command (HO), the buffers 30 are filled with cells to be transmitted and after handover the buffers 32 are filled with cells to be transmitted on the second path.

The cells in the memory 30 are therefore cells N−1, N−2, N and the cells in the buffer 32 are cells N+1, N+2, etc.

Transmission is in packet mode and the cells are therefore not dated because they can be transmitted at variable, non-deterministic times. The transmission of some cells can be delayed because cells of higher priority reach other buffers or because of the arrival of a larger flow of data.

According to the invention, to limit the signaling to be transmitted via the satellites, a transmitter 36 is authorized to transmit cells from the buffer 32 (the one assigned to the second path) only after a transmitter 34 has transmitted the last cell N from the buffer 30 on the first path.

To this end, in this example, a gate 38 is provided between the output of the buffer 32 and the input of the transmitter 36. The gate is controlled by the output signal of the buffer 30. The gate 38 remains closed until cell N has left the buffer 30. The gate opens when cell N has left the buffer 30 and has been transmitted on the first path by the transmitter 34.

The marking of the last cell in the buffer 30 can be reduced to one bit. It is most important to note that this marking is transmitted only within the transmitter (terminal or connection station) and is not transmitted via the satellite. In other words, this handover mechanism limits signaling and is therefore beneficial from the point of view of maximizing call capacity.

In a variant of the invention (not shown), the last cell in the buffer 30 is not marked and instead cells are blocked at the output of the buffer 32 for a particular time after the handover command HO sufficient for cells to be transmitted from the buffer 32 only after the last cell has been transmitted from the buffer 30.

Also, the cells are received by the receiver 40 in the correct order only if the transmission time from the transmitter to the receiver is the same for both paths. It is generally sufficient for cells or packets on the second path to arrive after cells or packets on the first path. In this way cells or packets do not arrive at the receiver simultaneously, and the transition therefore occurs without losses and the receiver can include a single demodulator 42 and a single buffer 44 (FIG. 2). FIG. 2 shows that the demodulator 42 can receive signals on the first and second paths via respective antennas 46 and 48 connected to the same input of the demodulator 42.

The propagation time from the transmitter to the receiver via the first path is proportional to the distance from the transmitter to the satellite $S_1$ plus the distance from that satellite to the receiver. For the second path, the propagation time is proportional to the distance from the transmitter to the second satellite plus the distance from the second satellite to the receiver. These distances are generally different. To make the transmission times the same, the transmitter and/or the receiver include(s) equalization buffers (not shown) and control means such that the time for which the cells remain in each of the buffers is adjusted so that the time spent in the transmitter's equalization buffers plus the time $T_a$ for the signals to travel from the transmitter to the receiver plus the time spent in the receiver's equalization buffers is constant and equal to 25 ms, for example.

FIG. 3 shows this property and represents three segments. The first segment $T_g$ is the time spent in the transmitter's (for example the connection station's) equalization buffers, the segment $T_a$ is the time corresponding to the propagation of the signals at the speed of light from the transmitter to the receiver via a satellite, and the third segment $T_t$ is the time the cells spend in the receiver's equalization buffers, i.e. those of a terminal in this example.

In another example (not shown), handover applies to transmission between a terminal of a mobile telephone system and a switch upstream of the base transceiver stations. A call between the switch and the terminal can be handed over from a first path through a first base transceiver station to a second path through a second base transceiver station.

In the example shown in FIG. 2a, each terminal or connection station has a set of buffers 60, 62, . . . , 66 for storing ATM cells and each buffer corresponds to a particular grade of service.

In an example, the buffer 60 corresponds to electronic mail transmission, the buffer 62 corresponds to telephone calls, and the buffer 66 corresponds to transmission of program data.

The memories are assigned variable priorities. Electronic mail has a lower priority than telephone calls, for example.

The rates of filling and emptying each buffer also depend on the corresponding grade of service and the bit rate of the information in the other buffers.

In this embodiment, the handover 70 from one path to another occurs at the Medium Access Control (MAC) level, i.e. downstream of the buffers 62, 66, but before the cells are multiplexed. The cells leaving the buffers must be multiplexed (at 72, 72' in FIG. 2a) by distributing the cells in accordance with a grid 74, 74' assigning each cell a particular time slot and/or a particular code (if the CDMA technique is used) as a function of the available resources.

Each multiplexing system includes its own power control function.

Also, the receiver 80 receives cells or packets in the correct order only if the transmission time from the transmitter to the receiver is the same on both paths. More generally, it is sufficient for cells or packets on the second path to arrive after cells or packets on the first path. Thus cells or packets therefore do not arrive simultaneously at the receiver and the transition therefore occurs without loss and the receiver can include a single demodulator and a single set of buffers.

In this example, equalization is obtained in the manner described with reference to FIGS. 2 and 3.

In a manner that is analogous to the FIG. 2 example, the handover mechanism shown in FIGS. 2a and 3 does not require any purge cell as used in the prior art, i.e. any marking of the last cell on the first path.

The transmission times of the cells 76', 78' on the second path are chosen so that the first cell 76' reaches the receiver 80 after the last cell 82 on the first path.

This embodiment is particularly simple to implement because the multiplexing systems 72 and 72' are independent of each other and there is therefore no constraint on the assignment of powers and resources.

Also, handover from one path to another is practically instantaneous because it occurs simultaneously for all the cells leaving the various buffers.

In the embodiment of the invention shown in FIGS. 3a, 3b and 3c, there are two sets of buffers, each buffer corresponding to a grade of service, as in the embodiment described with reference to FIG. 2a. For simplicity, these figures show only one buffer of the set. In this embodiment, the time of transmission of the cells on the second path is also chosen so that the first cell reaches the receiver after the last cell on the first path. The facility described with reference to FIG. 3 can be used for this purpose.

Each set 84, 86 of buffers is associated with a respective multiplexing system $84_1$ and $86_1$, as in the FIG. 2 example. The unit $84_1$ transmits on a first path and the unit $86_1$ transmits on a second path. In the example described, each path corresponds to an antenna pointed at a satellite.

FIG. 3b shows the situation of transmission on the first path before preparing transmission on the second path. Under these conditions, only the set 84 of buffers is fed with cells to be transmitted, the set 86 of buffers remaining empty.

FIG. 3b shows a step of preparing for handover, transmission on the first path, i.e. via the transmitter $84_1$, continuing but filling of the set 86 assigned to the second path beginning.

To be more precise, in this embodiment, the two sets of buffers 84, 86 are filled with identical cells in a preparation step, before handing over transmission from the first path to the second path. The cells of each connection are therefore duplicated. Accordingly, in the situation shown in FIG. 3b, the initially empty set 86 is filled. The set 84 continues to be filled, but also continues to be emptied because of the transmission of cells on the first path.

There is a gate $84_2$, $86_2$ between the output of each buffer of the set 84, 86 and the corresponding transmitter $84_1$, $86_1$. The gate $84_2$ is opened to enable transmission and the gate $86_2$ is closed to prevent transmission.

The two sets 84, 86 of buffers have identical contents after a particular time which depends on the transmission of cells on the first path. Handover from the first path to the second path can occur from that time. It entails closing the gate $84_2$ and opening the gate $86_2$.

For the first cell on the second path to arrive immediately after the last cell on the first path, the procedure is as described with reference to FIGS. 2, 2a and 3, i.e. cells on the first or second path are delayed so that cells on the second path reach the receiver after those on the first path and the transmission times on the two paths are preferably equal (FIG. 3).

To verify that the contents of the buffers are identical, during duplication the cells are stored in the buffers of the sets 84 and 86 with a number, an indication of the flow (the buffer or queue) to which they belong and an indication of the receiver they are to reach. The buffers of the set 84 pass onto the buffers of the set 86 this number and the other information for cells transmitted on the first path.

The contents of the buffers of the sets 84 and 86 are considered to be identical when all the duplicated first cells of all the flows addressed to all the terminals have been transmitted on the first path. In this case, all subsequent cells are necessarily in set 86.

The information supplied by the set 84 to the set 86 on the cells that have been transmitted enables cells already transmitted on the first path to be eliminated from the buffers of the set 86 at the time of handover, i.e. at the start of transmission by the transmitter $86_1$.

In this embodiment, in which handover from the first path to the second path occurs when the contents of the buffers are identical, the time between the start of duplication of the cells and handover can be minimized. However, this can be relatively complex because determining the time from which the contents of the two sets of buffers are identical requires the set 84 to supply information to the set 86.

This is why, in one variant of the invention, handover occurs a predetermined time after the start of duplication.

This latter feature can easily be implemented in a telecommunications system using non-geostationary satellites because the positions of the satellites are known in advance and handover times can be predetermined and therefore anticipated.

In one example, the time between starting cell duplication and handover is in the order of 2 seconds.

If, after handover, the set 86 contains cells that have already been transmitted by means of the set 84, the cells that have already been transmitted on the first path are eliminated from the set 86. As in the embodiment previously described, it is therefore necessary to compare the contents of the sets 84 to 86 of buffers. However, less signaling is required than in the embodiment for which handover from the first path to the second path occurs as soon as the contents of the buffers are identical.

Regardless of the embodiment used, it is no longer necessary to duplicate the cells after handover to the second path. Under these conditions, transmission is effected as shown in FIG. 3c, i.e. only via the set of buffers 86.

In the variant of the invention shown in FIG. 4, as in the embodiment of the invention shown in FIGS. 3a to 3c, there are two sets of buffers, one for each path. The set 88 is for the first path and the set 90 is for the second path.

In this variant of the invention, handover consists in transferring data from the set 88 of buffers to the set 90 of buffers. This occurs after the last cell is transmitted on the first path. The transfer of data from the set 88 to the set 90 can be either serial or parallel. Note that the transfer of data is not of the same nature as the transfer of information described with reference to FIGS. 3a to 3c, since here it is a question of data as such, not information data such as numbers or identifiers of connections or flows to which the cells belong.

Data can be transferred from one path to another at any time and the transfers for the various buffers can therefore be synchronized.

The FIG. 5 diagram shows the evolution with time of data reaching a receiver.

Diagram a) in FIG. 5 corresponds to the operation of a receiver using the prior art process in which the receiver re-orders the cells from both paths. The first line 92 of this part a) of the diagram corresponds to the arrival time of cells on the first path and the line 94 corresponds to the arrival times of cells on the second path. There is therefore an overlap period 96, which requires the receiver to have two demodulators and two sets of buffers.

Diagrams b) in FIG. 5 correspond to the results obtained with systems of the invention in which there is a plurality of flows or connections, i.e. of buffers. These diagrams show that data from the first buffers arrives in a period 98 on the first path and then in a period 100 on the second path. The two periods 98 and 100 do not overlap and can join instantaneously, as shown. Similarly, for the second buffers, cells on the first path arrive in a period $98_1$ and cells on the second path arrive in a period $100_1$, with no overlap, and the transition 99 from the period 98 to the period 100 is simultaneous with the transition $99_1$ from the period $98_1$ to the period $100_1$.

What is claimed is:

1. A method of transmitting non-dated or non-numbered digital data in packet mode between a remote transmitter and a remote receiver in which the data is able to take at least two different paths between the transmitter and the receiver and handover from a first path to a second path occurs during transmission, wherein during handover within the transmitter cells or packets intended for the second path are transmitted only after the last cell dr. packet intended for the first path has been transmitted and, wherein during handover within the transmitter and/or within the receiver cells or packets on the first or second path are delayed so that cells or packets on the second path arrive after cells or packets on the first path.

2. A method according to claim 1, wherein a first buffer temporarily stores data to be transmitted on the first path and a second buffer temporarily stores data to be transmitted on the second path and wherein transmission of data from the second buffer is blocked until the last cell or packet on the first path has been transmitted.

3. A method according to claim 2, wherein the last cell or packet on the first path is marked in the transmitter, the mark is used to unblock transmission on the second path and the mark is eliminated for transmission to the receiver.

4. A method according to claim 2, wherein transmission on the second path is blocked for a predetermined time following the command to hand over from the first path to the second path.

5. A method according to claim 1, wherein, to enable reception of cells or packets on the first path after reception of cells or packets on the first path, cells or packets on the first or second path are delayed for a time enabling the transmission times on the two paths to be made equal.

6. A method according to claim 5, wherein equalization buffers are used in the transmitter and/or in the receiver to obtain equal transmission times.

7. A method according to claim 1, wherein a set of buffers temporarily stores data to be transmitted, each buffer corresponds to a particular type of data to be transmitted and handover from the first path to the second path occurs practically synchronously for the various buffers of the set.

8. A method according to claim 7, wherein the cells or packets are delayed long enough for the transmission time on the first and second paths to be equal.

9. A method according to claim 7, wherein the buffers for temporarily storing data to be transmitted and/or received are used to delay the cells.

10. A method according to claim 7, wherein handover occurs at the output of the buffers before multiplexing the cells or packets for transmission.

11. A method according to claim 10, wherein the two paths are multiplexed independently of each other.

12. A method according to claim 7, wherein there are two sets of buffers, one for each path.

13. A method according to claim 12, wherein the two sets of buffers are filled with the same cells or packets before handover from the first path to the second path, handover occurring when the contents of the buffers are identical.

14. A method according to claim 13, wherein handover occurs a predetermined time after the start of filling the buffers with the same cells or packets.

15. A method according to claim 13, wherein handover occurs when it is determined that the contents of the buffers are identical.

16. A method according to claim 15, wherein the contents of the buffers are considered identical when the first duplicated cell or packet of the last connection has been transmitted on the first path.

17. A method according to claim 13, wherein cells or packets which have already been transmitted by the first path are eliminated from the second set of buffers between transmission of the last cell or packet on the first path and the start of transmission on the second path.

18. A method according to claim 7, wherein each buffer is intended for a particular grade of service and/or a particular flow.

19. A receiver adapted to receive digital data transmitted by the method according to claim 1, the receiver including a single demodulator.

20. A transmitter for implementing the method according to claim 2 comprising two buffers, the first of which is for temporarily storing non-dated or non-numbered cells or packets to be transmitted on a first path and the second of which is for temporarily storing non-dated or non-numbered cells or packets to be transmitted on the second path, the transmitter including means for preventing transmission of data at the output of the second buffer and said means are inhibited after transmission of the last cell or packet on the first path.

21. A transmitter according to claim 20, including means for marking the last cell on the first path with a mark which is used to command inhibiting of the means preventing transmission of data on the second path.

22. A transmitter according to claim 21, wherein the mark is eliminated before transmitting the last cell or packet on the first path.

23. A transmitter according to claim 20, wherein the means for preventing transmission of data at the output of the second buffer comprise time-delay means such that the means preventing transmission of data from the second buffer remain active for a particular time after the command to hand over from the first path to the second path.

24. A transmitter according to claim 20, including at least one equalization buffer for delaying cells or packets on the first or second path long enough for the transmission times on the two paths to be equal.

25. A transmitter according to claim 24, wherein the temporary storage buffers are also used for the equalization.

26. The application of the method according to claim 1 to a telecommunications system using a constellation of satellites in low or medium orbit in which all the terminals communicate with a connection station via a satellite and another satellite takes over the call, in particular when the first satellite begins to quit the area of visibility of the terminal(s) concerned.

27. The application of the method according to claim 1 to a cellular telecommunications system in which each cellular area includes a base transceiver station for connecting the terminals to the network via a switch, the terminals communicate via a base transceiver station and a call can be handed over from a first path via a first base transceiver station to a second path via a second base transceiver station.

* * * * *